April 30, 1935.    J. B. BAMBENEK    1,999,714
COMBINED CONNECTER AND ANTICHAFING BEARING FOR TIRE CHAINS
Filed Feb. 19, 1934
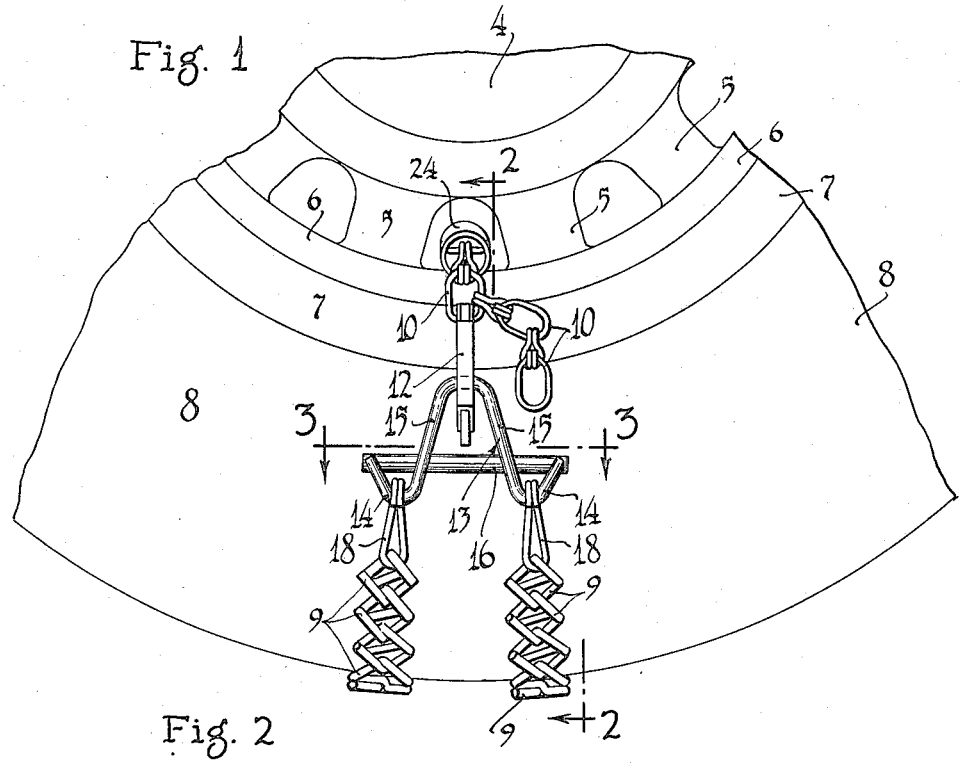
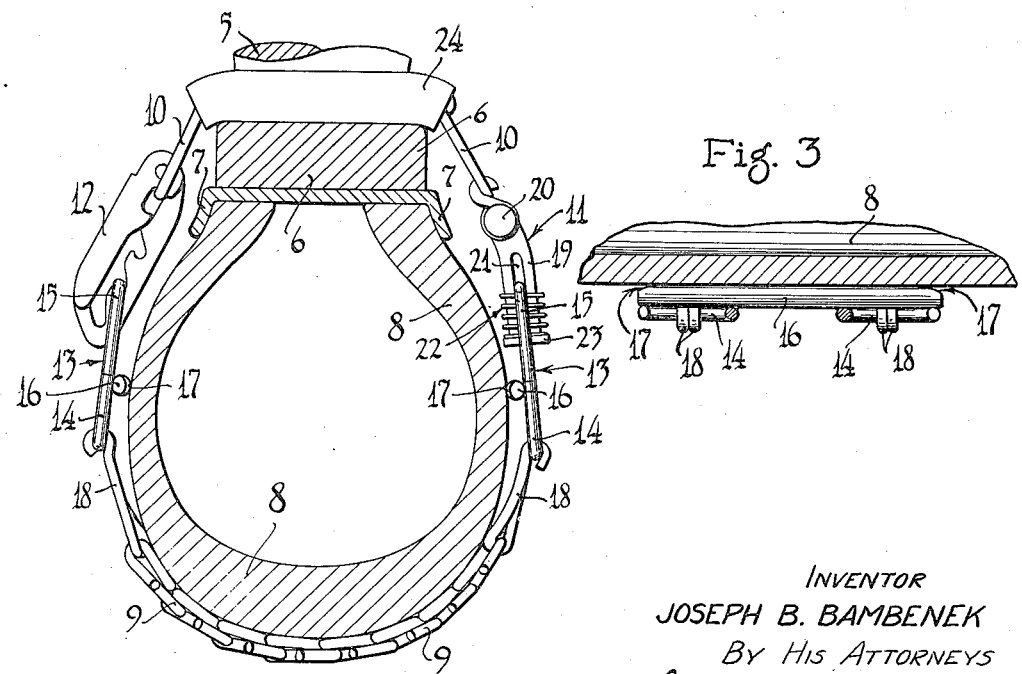
INVENTOR
JOSEPH B. BAMBENEK
By His Attorneys Patented Apr. 30, 1935

1,999,714

UNITED STATES PATENT OFFICE 1,999,714

COMBINED CONNECTER AND ANTICHAFING BEARING FOR TIRE CHAINS

Joseph B. Bambenek, Winona, Minn., assignor to Peerless Chain Company, Winona, Minn., a corporation of Minnesota Application February 19, 1934, Serial No. 711,939

5 Claims. (Cl. 152—14)

My present invention relates to traction devices for the wheels of automotive vehicles and of the type commercially known as emergency chains. Such traction devices usually include a plurality of tread members arranged to extend over the tread of a tire and a cross-tie member arranged to extend between certain of the spokes of a wheel. The tread and cross-tie members are attached to connecters on opposite sides of the tire and hold the same properly spaced. These connecters in their present form are highly objectionable for the reason that they, together with the connected ends of the tread and cross-tie members, chafe, wear and mutilate the sides of a tire, thus spoiling the appearance thereof and also shortening the life of the tire.

The object of this invention is the provision of extremely simple and highly efficient combined connecters and anti-chafing bearings. These anti-chafing bearings are designed to engage the sides of a tire and hold the connecters out of engagement therewith.

To the above end, generally stated, the invention consists of the novel devices, combinations of devices and arrangement of parts hereinafter described and defined in the claims.

In the accompanying drawing, which illustrates the invention, like characters indicate like parts throughout the several views.

Referring to the drawing:

Fig. 1 is a fragmentary outside elevation of a pneumatic tire-equipped automotive vehicle wheel to which is applied a traction device having the invention embodied therein;

Fig. 2 is a view partly in elevation and partly in transverse section taken on the irregular line 2—2 of Fig. 1, on an enlarged scale; and Fig. 3 is a fragmentary detail view with some parts sectioned on the line 3—3 of Fig. 1.

The parts of the wheel illustrated are as follows: the hub 4, the spokes 5, the felly 6, the rim 7 and the casing 8 of a pneumatic tire.

The traction device illustrated includes a pair of laterally spaced tread chains 9, a cross-tie chain 10, a spring take-up device 11, a lock device 12, and a pair of combined connecters and anti-chafing bearings 13. From a broad viewpoint, the chain 10 and devices 11 and 12 form a cross-tie connection for the tread chains.

The anti-chafing bearings 13 are the subject-matter of the present invention; the spring take-up device 11 is the subject-matter of the application No. 709,154 filed January 31, 1934, and the lock device 12 is disclosed and broadly claimed in United States Letters Patent "Combined slack take-up and lock device for tire chains", No. 1,928,474 of date September 26, 1933, Joseph B. Bambenek, inventor.

Each connecter 13, as shown, includes a pair of end yokes 14 and an intermediate yoke 15 in substantially the plane and formed from a single round rod. The yokes 14 and 15 extend in opposite directions with their arms projecting inwardly.

The anti-chafing bearing, as shown, is a round relatively long rod 16 that extends transversely under the arms of the yokes, at their ends, and is rigidly secured thereto by welding or otherwise. It is important to note that the ends of the bearing rods 16 are upwardly and outwardly rounded at 17 so that they will freely slide endwise on the side of the tire 8 without marring or otherwise injuring the same.

The treads chains 9 are attached, at their ends, to the yoke 16 by hook-line links 18 and the spring take-up device 11 permanently connects the cross-tie chain 9, at one end, to the yoke 15 of one of the connecters. This spring take-up device 11, as shown, includes a flat link 19, one end of which extends between the side of the link at the respective end of the cross-tie chain 9 and is secured thereto by a headed pivot pin 20. Formed in the link 19 is an intermediate longitudinally extended slot 21 through which the transverse portion of the respective yoke 15 extends and connects said link thereto for compound endwise sliding and pivotal movements. It may be stated that the link 19 and connected yoke 15 form a slip connection which, as shown, is between the cross-tie chain 10 and the respective combined connecter and bearing 13, but may be interposed in the cross-tie chain 9 at any desired point. Encircling the outer end portion of the link 19 is a coiled compression spring 22 yieldingly held between the transverse portion of the yoke 15 and a T-head 23 on the outer end of said link.

The lock device 12 extends through the respective yoke 15 and one of the links forming the outer end portion of the cross-tie chain 9. This lock device 12, when closing, has a lever action that draws the cross-tie chain 9 endwise toward said device and places the spring 22 under compression.

The purpose of the tension device is fully set forth in the application heretofore referred to.

The anti-chafing bearings 16 engage the sides of the tire 8 at substantially diametrically opposite points and, for convenience, the traction device is applied to said tire with the lock device 12 on the outer side thereof, where the same may be conveniently operated.

Obviously the bearings 16 rockably support the yokes 14 and 15 and hold the same, together with the connected lock device 12, spring take-up device 11 and the links 18, out of contact with the sides of the tire 8. As the yokes 15 are somewhat longer than the yokes 14, the increased leverage thereof under the inwardly yielding pull thereon by the cross-tie connection 10 will rock the bearings 16 on the sides of the tire 8 as fulcrums and lift the links 18 from the sides of said tire and thus hold the same.

During flexing of the tire as the same moves over a road bed, the bearings 16 are free to rock and move endwise on the sides of said tire without injuring the same and at the same time hold the several parts attached thereto out of contact with said tire.

In case the links 18 do come in contact with the sides of the tire 8 they will only lightly engage the same and substantially all of the pressure will be on the rods 16.

When the cross-tie chain passes over the felly 6, it is encased in a rubber tube 24 to prevent said chain from marring the felly 6.

It will be understood that the invention disclosed is capable of various modifications within the scope of the invention herein disclosed and claimed.

What I claim is:

1. A pair of connecters connecting a pair of tread members to a cross-tie member, each connecter comprising a body portion and an anti-friction portion, said tread members being laterally spaced and attached at their ends to the body portions and said cross-tie portion being attached at its ends to the body portions midway between the tread members, said tread and cross-tie members being constructed and arranged to be placed transversely around a wheel rim having a tire mounted thereon with the anti-chafing portions bearing on the tire at opposite sides thereof and normally holding the connecters and attached ends of the tread and cross-tie members out of engagement with the tire.

2. A pair of connecters connecting a pair of tread members to a cross-tie member, each connecter comprising a body portion and an anti-chafing portion, the ends of said members being attached to the connecters in triangular arrangement with the ends of the cross-tie member at the apexes of the triangles, said tread and cross-tie members being constructed and arranged to be placed transversely around a wheel rim and a tire mounted thereon, said connecters being on opposite sides of the tire with their anti-chafing portions engaging the same and holding the connecters spaced therefrom, each connecter being a rod bent to form two end yokes and an intermediate yoke, said yokes being in substantially the same plane with the intermediate yoke, extending in the opposite direction from the end yokes and with the arms of the yokes extending inwardly, the anti-chafing portions of each connecter being a rod extending transversely across the arms of the respective body portion and rigidly secured thereto.

3. A pair of connecters connecting a pair of tread members to a cross-tie member, each connecter comprising a body portion and an anti-chafing portion, the ends of said members being attached to the connecters in triangular arrangement with the ends of the cross-tie member at the apexes of the triangles, said tread and cross-tie members being constructed and arranged to be placed transversely around a wheel rim and a tire mounted thereon, said connecters being on opposite sides of the tire with their anti-chafing portions engaging the same and holding the connecters spaced therefrom with freedom for rocking movement transversely of the tire.

4. A pair of connecters connecting a pair of cross-tread members to a cross-tie member, each connecter comprising a body portion and an anti-chafing portion, each body portion comprising a rod bent to form two end yokes, to which the respective ends of the tread members are attached, and an intermediate yoke extending in the opposite direction from the end yoke and to which intermediate yoke the respective end of the cross-tie member is attached, said tread and cross-tie members being constructed and arranged to be placed transversely around a wheel rim and a tire mounted thereon, said connecters being on opposite sides of the tire with their anti-chafing portions engaging the same and holding the connecters spaced from the tire with freedom for rocking movement transversely of the tire, said connecters normally holding the connected end portions of the tread and cross-tie members out of contact with the tire.

5. The structure defined in claim 4 in which each anti-chafing portion is a rod that extends transversely of the yokes of the respective body portions on the inside thereof and rigidly attached to the arms of said yokes.

JOSEPH B. BAMBENEK.